(12) United States Patent
Wei et al.

(10) Patent No.: US 9,984,069 B2
(45) Date of Patent: May 29, 2018

(54) INPUT METHOD, INPUT APPARATUS, AND TERMINAL

(71) Applicant: Huawei Device Co., Ltd., Shenzhen (CN)

(72) Inventors: Konggang Wei, Shenzhen (CN); Guanghua Zhong, Shenzhen (CN); Gang Zhang, Shenzhen (CN)

(73) Assignee: HUAWEI DEVICE (DONGGUAN) CO., LTD., Shenzhen (CN)

( * ) Notice: Subject to any disclaimer, the term of this patent is extended or adjusted under 35 U.S.C. 154(b) by 494 days.

(21) Appl. No.: 13/826,487

(22) Filed: Mar. 14, 2013

(65) Prior Publication Data

US 2013/0275119 A1    Oct. 17, 2013

(30) Foreign Application Priority Data

Mar. 16, 2012  (CN) .......................... 2012 1 0070159

(51) Int. Cl.
*G06F 17/27* (2006.01)
*G06F 17/21* (2006.01)
(Continued)

(52) U.S. Cl.
CPC .............. *G06F 17/28* (2013.01); *G06F 3/018* (2013.01); *G06F 3/0233* (2013.01)

(58) Field of Classification Search
CPC .. G06F 3/0237; G06F 3/04883; G06F 3/0233; G06F 17/2735; G06F 17/3064
(Continued)

(56) References Cited

U.S. PATENT DOCUMENTS 7,809,719 B2 * 10/2010  Furuuchi et al. ............. 707/723
9,659,002 B2 *  5/2017  Medlock ............... G06F 17/276
(Continued)

FOREIGN PATENT DOCUMENTS

CN          1389778 A       1/2003
CN          1908864 A       2/2007
(Continued)

OTHER PUBLICATIONS

Masui, "An Efficient Text Input Method for Pen-based Computers", 1998, In Proceedings of CHI'98, pp. 328-335.*

*Primary Examiner* — Olujimi Adesanya
(74) *Attorney, Agent, or Firm* — Brinks Gilson & Lione

(57) ABSTRACT

The present invention discloses an input method, including: receiving input end indication information sent by an input module, where the input end indication information indicates that input of a character or a word ends; obtaining a location of a cursor; identifying the input character or word forward from the location of the cursor until a first punctuation input before the character or the word is identified; using the identified character or word as a previous text, and querying a word library for a next text associated with the previous text; and outputting the associated next text to a display module for displaying. The input method provided in embodiments of the present invention is capable of associating a next text according to an input previous text for a user to select after the user presses an input end key, for example, the space key, to end the input of a character or a word, so that the input efficiency is increased.

18 Claims, 2 Drawing Sheets

(51) Int. Cl.
    *G06F 17/28*    (2006.01)
    *G06F 3/01*     (2006.01)
    *G06F 3/023*    (2006.01)
(58) Field of Classification Search
    USPC ........................................................ 704/9, 10
    See application file for complete search history.

(56)        References Cited

U.S. PATENT DOCUMENTS

2002/0019731 A1*  2/2002  Masui et al. ................. 704/7
    2002/0038207 A1*  3/2002  Mori et al. ................... 704/9
    2005/0017954 A1   1/2005  Kay et al.
    2008/0072143 A1*  3/2008  Assadollahi ........... G06F 3/0236
                                                          715/261
    2008/0195571 A1*  8/2008  Furuuchi ............... G06F 17/276
                                                          706/56
    2008/0204421 A1*  8/2008  Hsu ............................ 345/173
    2009/0234632 A1   9/2009  Hasegawa et al.
    2011/0093497 A1*  4/2011  Poon ............................ 707/769
    2012/0117101 A1*  5/2012  Unruh ................. G06F 17/3064
                                                          707/765
    2013/0275119 A1   10/2013 Wei et al.

FOREIGN PATENT DOCUMENTS

CN        1908866 A        2/2007
    CN        101308515 A      11/2008
    CN        101634905 A      1/2010
    CN        101957724 A      1/2011
    CN        102629160 A      8/2012
    JP        09069086 A       3/1997
    JP        11212967 A       8/1999
    JP        2007-506184 A    3/2007
    JP        2011-138252 A    7/2011
    WO        WO 2005/036413 A1 4/2005

* cited by examiner

INPUT METHOD, INPUT APPARATUS, AND TERMINAL

CROSS-REFERENCE TO RELATED APPLICATIONS

This application claims priority to Chinese Patent Application No. 201210070159.1, filed on Mar. 16, 2012, which is hereby incorporated by reference in its entirety.

FIELD OF THE INVENTION

The present invention relates to the field of communication technologies, and in particular, to an input method, an input apparatus, and a terminal.

BACKGROUND OF THE INVENTION

At present, all Chinese input methods are capable of making association only according to frequently used words when a user inputs a character. For example, when we input characters "lianx" by using the Sogou pinyin input method, the input method may automatically display such words as "联想", "练习", "怜惜", ""联系", and "连续", thereby facilitating the input. When we do not input characters, the cursor is located somewhere in a file.

The Chinese/English input method may be used to associate words according to social hot expressions, sports terms, and frequently used information words when the user inputs characters, which can speed up the typing and increase the input efficiency. However, this association method is used only when Pinyin characters are input.

During the research and practice of the prior art, the inventor of the present invention discovers that the input method in the prior art is capable of associating related expressions only when characters are input; once the user presses an input end key, for example, the space key, to end the input of a character or a word, no association is made.

SUMMARY OF THE INVENTION

Embodiments of the present invention provide an input method, which is capable of associating a next text according to an input previous text for a user to select after the user presses an input end key to end the input of a character or a word, so that the input efficiency is increased. The embodiments of the present invention also provide an input apparatus and a terminal.

An input method includes:
receiving input end indication information sent by an input module, where the input end indication information indicates that input of a character or a word ends;
obtaining a location of a cursor;
identifying the input character or word forward from the location of the cursor until a first punctuation input before the character or the word is identified;
using the identified character or word as a previous text, and querying a word library for a next text associated with the previous text; and
outputting the associated next text to a display module for displaying.

An input apparatus includes:
a receiving unit, configured to receive input end indication information, where the input end indication information indicates that input of a character or a word ends;
an obtaining unit, configured to obtain a location of a cursor after the receiving unit receives the input end indication information;
an identifying unit, configured to identify the input character or word forward from the location of the cursor obtained by the obtaining unit until a first punctuation input before the character or the word is identified;
a querying unit, configured to use the character or the word identified by the identifying unit as a previous text, and query a word library for a next text associated with the previous text; and
an outputting unit, configured to output the next text, which is found by the querying unit and associated with the previous text, to a display module for displaying.

A terminal includes an input apparatus, an input module, and a display module, where:
the input module inputs, to the input apparatus, input end indication information of a character or a word, where the input end indication information indicates that input of the character or the word ends;
the input apparatus obtains a location of a cursor after receiving the input end indication information of the character or the word; identifies the input character or word forward from the location of the cursor until a first punctuation input before the character or the word is identified; uses the identified character or word as a previous text, and queries a word library for a next text associated with the previous text; and outputs the associated next text; and
the display module displays the next text input by the input apparatus for a user to select to input.

In the embodiments of the present invention, input end indication information sent by an input module is received, where the input end indication information indicates that input of a character or a word ends; a location of a cursor is obtained; the input character or word is identified forward from the location of the cursor until a first punctuation is identified; the identified character or word are used as a previous text, and a word library is queried for a next text associated with the previous text; the associated next text is output to a display module for displaying. Compared with the prior art, the input method provided in the embodiments of the present invention is capable of associating a next text according to an input previous text for the user to select after the user presses an input end key, for example, the space key, to end the input of a character or a word, so that the input efficiency is increased.

DETAILED DESCRIPTION OF THE EMBODIMENTS

An embodiment of the present invention provides an input method, which is capable of associating a next text according to an input previous text for a user to select after the user presses an input end key, for example, the space key, to end the input of a character or a word, so that the input efficiency is increased. An embodiment of the present invention also provides an input apparatus and a terminal. The embodiments are respectively described in detail below.

Figure 1:
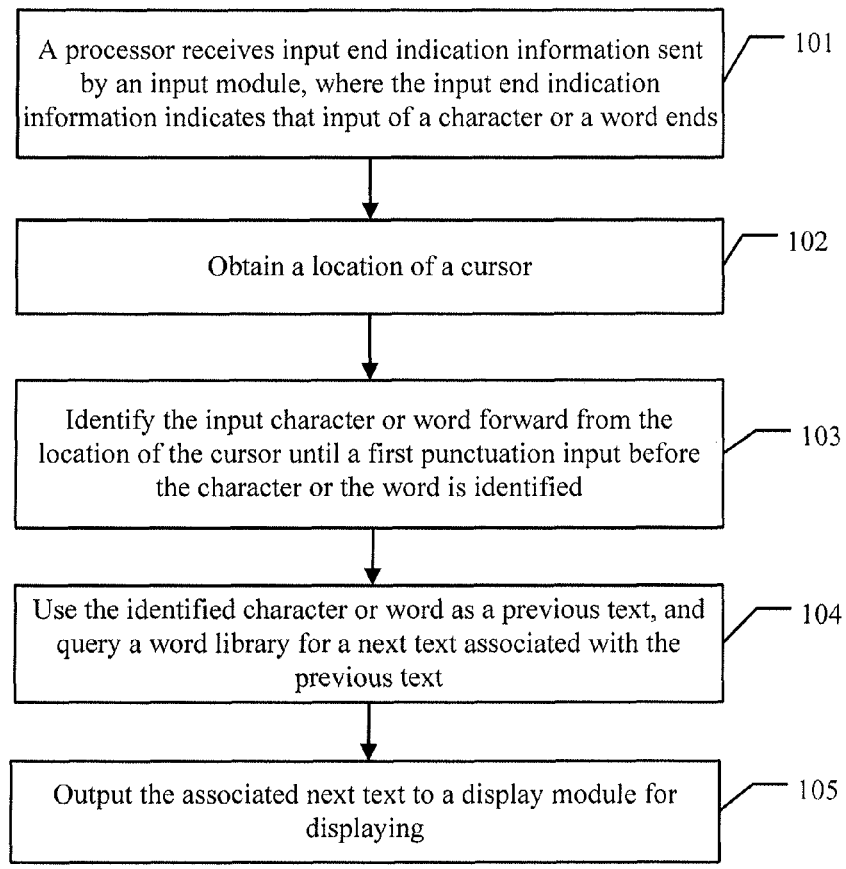
FIG. 1 is a schematic diagram of an embodiment of an input method according to an embodiment of the present invention.

Referring to FIG. 1, an embodiment of an input method provided in an embodiment of the present invention includes the following:

101. An input apparatus receives input end indication information sent by an input module, where the input end indication information indicates that input of a character or a word ends.

The input module may be a module having an input function, for example, a computer keyboard, handset keys, and the like.

The input end indication information is implemented by the user by pressing an input end key, for example, the space key, and the like. If the input apparatus receives the input end indication information, it means that input of the previous input character or word is completed. The input end indication information of the Chinese input method and that of the English input method are the same, and the input end indication information is sent when the user presses the space key or a punctuation key.

102. Obtain a location of a cursor.

The input method in the prior art is capable of making association according to frequently used words only when characters are input. For example, when we input characters "lianx" by using the Sogou pinyin input method, the input method may automatically display such words as "联想", "练习", "怜惜", ""联系", and "连续". When the input of characters is completed, for example, when the words "想" are input, the cursor is located after the word "联想" and the input method displays nothing until the user inputs a character again.

By using the input method provided in the embodiment of the present invention, when a user presses an input end key, for example, the space key, to end the input of a character or a word, a next text may be associated according to the input previous text, that is, when the cursor is located after a character or a word, the input method may be used to associate an expression or a sentence related to the input character or word, for example, when the expression "日出江花红胜火" is input and the cursor is located after the word "火", the input method provided in the embodiment of the present invention may associate the expression "春来江水绿如蓝". In this way, the user can directly select the displayed "春来江水绿如蓝", without the need of inputting any character.

For the input apparatus, after the user inputs the input end indication information of a character or a word by using the input module, the input apparatus begins to obtain the location of the cursor.

103. Identify the input character or word forward from the location of the cursor until a first punctuation input before the character or the word is identified.

A next text needs to be associated according to the previous text; the range of previous text contents needs to be firstly determined; the previous text contents provided in the embodiment of the present invention refer to a segment of contents starting from the location of the cursor to the identified first punctuation. For example, when the input characters include "大诗人白居易的 忆江南中写道：日出江花红胜火，" and the cursor is located after the word "火" or after the comma ",", according to the method in step 101, it is firstly determined that the cursor is located after the word "火" or after the comma ",", and then the input characters are identified forward from the location of the cursor until the colon ":" input before the characters or the words is identified; and the identified segment of contents "日出江花红胜火" is used as the previous text contents.

Only a Chinese example is provided herein. Actually, English may also be input, for example, if "teacher said: good good study," is input and the cursor is located at an adjacent location after the comma ",", "good good study" may be used as a previous text, so that a corresponding next text is associated.

104. Use the identified character or word as a previous text, and query a word library for a next text associated with the previous text.

In step 103, a segment of a character or a word starting from the location of the cursor to the identified first punctuation input before the character or the word is identified, and the identified character or word are used as the previous text; and the word library is queried for a next text associated with the previous text. The specific querying solution includes:

querying the word library for all expressions and sentences including the previous text, and using an expression or a sentence that exists in the found expressions and sentences but does not exist in the previous text as a next text; for example, if the previous text is "日出江花红胜火", it may be found that a sentence including "日出江花红胜火" is a line in the poem "日出江花红胜火", that is, "春来江水绿如蓝，忆江南". In this way, when the cursor is located after the word "火", it is determined that the next text associated with the previous text is ", 春来江水绿如蓝"; when the cursor is located after the comma ",", it is determined that the next text is " 春来江水绿如蓝".

When the previous text is "good good study", it may be found that a sentence including "good good study" is "good good study, day day up"; when the cursor is located after the comma ",", a next text associated with the previous text is "day day up".

The example illustrated in the foregoing solution is special, that is, it is a poem, where a whole sentence can be associated. Actually, sometimes it is not necessary to use an input segment of words for query and association based on the entire previous text, for example, if the input previous text is "根据光标的" and the cursor is located after the word "的", an expression or a sentence including the previous text "根据光标的" may not exist according to the foregoing solution. At this time, no next text may be associated. In this case, the embodiment of the present invention also provides another association solution. Specific details are as follows:

The previous text is grouped according to an input sequence and frequently used words, and a last input group of characters or words is used as an index; the word library is queried for expressions and sentences including the index, and an expression or a sentence that exists in the found expressions and sentences but does not exist in the index is used as the next text. The group last input according to the input time sequence is a group closest to the location of the cursor.

For example, according to this solution, the previous text is "根据光标的", which can be divided into two groups, namely, "联想" and "光标的"; according to the input time sequence, the "光标的" is the last input group. In this case, the group "光标的" is the group closest to the location of the cursor; "光标的" is used as an index to query for an expression and a sentence including the "光标的", and an expression like "光标的位置" can be found easily. In this way, "位置" can be used as the next text of the index "光标的" according to this solution.

105. Output the associated next text to a display module for displaying.

In step 104, multiple next texts may be associated. For example, when the previous text is "中国", the associated next text may include a series of expressions, such as "中国移动", "中国联通", and "中国深圳". The input apparatus outputs these expressions to a display module, for example, a display screen for displaying. At this time, the user may select an associated next text directly according to actual needs, without the need of inputting pinyin or words, thereby increasing the input efficiency of the input method.

In the embodiment of the present invention, input end indication information sent by an input module is received, where the input end indication information indicates that input of a character or a word ends; a location of a cursor is obtained; the input character or word is identified forward from the location of the cursor until a first punctuation is identified; the identified character or word is used as a previous text, and a word library is queried for a next text associated with the previous text; the associated next text is output to a display module for displaying. Compared with the prior art, according to the input method provided in the embodiment of the present invention, it is capable of associating a next text according to an input previous text for the user to select after the user presses an input end key, for example, the space key, to end the input of a character or a word, so that the input efficiency is increased.

Figure 2:
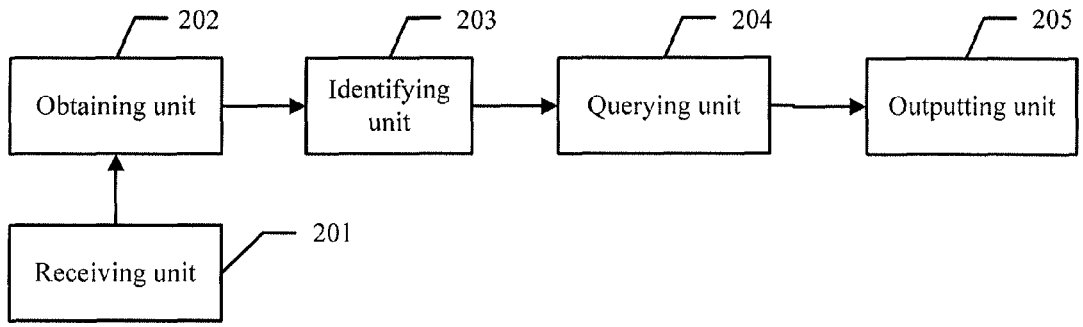
FIG. 2 is a schematic diagram of an embodiment of an input apparatus according to an embodiment of the present invention.

Referring to FIG. 2, an embodiment of an input apparatus provided in an embodiment of the present invention includes:

a receiving unit 201, configured to receive input end indication information sent by an input module, where the input end indication information indicates that input of a character or a word ends;

an obtaining unit 202, configured to obtain a location of a cursor after the receiving unit 201 receives the input end indication information;

an identifying unit 203, configured to identify the input character or word forward from the location of the cursor obtained by the obtaining unit 202 until a first punctuation input before the character or the word is identified;

a querying unit 204, configured to use the character or the word identified by the identifying unit 202 as a previous text, and query a word library for a next text associated with the previous text; and an outputting unit 205, configured to output the next text, which is found by the querying unit 204 and associated with the previous text, to a display module for displaying.

In the embodiment of the present invention, the receiving unit 201 receives input end indication information sent by an input module, where the input end indication information indicates that input of a character or a word ends; after the receiving unit 201 receives the input end indication information, the obtaining unit 202 obtains a location of a cursor; the identifying unit 203 identifies the input character or word forward from the location of the cursor obtained by the obtaining unit 202 until a first punctuation input before the character or the word is identified; the querying unit 204 uses the character or the word identified by the identifying unit 202 as a previous text, and queries a word library for a next text associated with the previous text; the outputting unit 205 outputs the next text, which is found by the querying unit 204 and associated with the previous text, to a display module for displaying. The input apparatus provided in the embodiment of the present invention is capable of associating a next text according to an input previous text for the user to select after the user presses an input end key, for example, the space key, to end the input of a character or a word, so that the input efficiency is increased.

On the basis of the embodiment illustrated in FIG. 2, in another embodiment of an input apparatus provided in an embodiment of the present invention, the querying unit 204 is specifically configured to query the word library for all expressions and sentences including the previous text, and use an expression or a sentence that exists in the found expressions and sentences but does not exist in the previous text as a next text.

Figure 3:
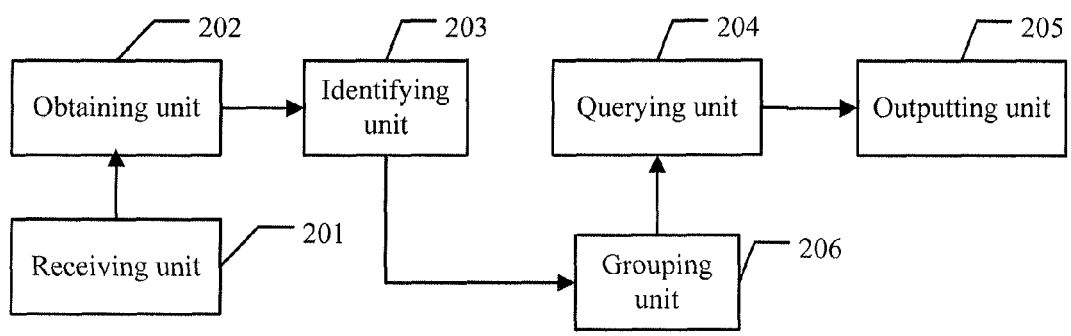
FIG. 3 is a schematic diagram of another embodiment of an input apparatus according to an embodiment of the present invention.

Referring to FIG. 3, on the basis of the embodiment illustrated in FIG. 2, another embodiment of an input apparatus provided in an embodiment of the present invention includes:

a grouping unit 206, configured to group the previous text according to an input sequence and a frequently used word, and use a last input group of a character or a word as an index; where the querying unit 204 is specifically configured to query the word library for expressions and sentences including the index determined by the grouping unit 206, and use an expression or a sentence that exists in the found expressions and sentences but does not exist in the index as a next text.

The input apparatus provided in the embodiment of the present invention is capable of associating a next text according to an input previous text for the user to select after the user presses an input end key to end the input of a character or a word, so that the input efficiency is increased.

In the input apparatus provided in the embodiment of the present invention, the receiving unit, the obtaining unit, the identifying unit, the querying unit, the outputting unit, and the grouping unit may be parts of a processor. The functions of these units may be executed by the processor.

The input apparatus provided in the embodiment of the present invention may be a processor.

Figure 4:
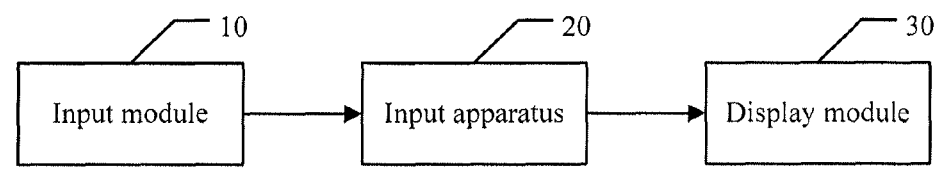
FIG. 4 is a schematic diagram of an embodiment of a terminal according to an embodiment of the present invention.

Referring to FIG. 4, an embodiment of the present invention also provides a terminal. The terminal provided in the embodiment of the present invention includes an input apparatus 20, an input module 10, and a display module 30.

The input module 10 is configured to input, to the input apparatus, input end indication information of a character or a word, where the input end indication information indicates that input of the character or the word ends.

The input apparatus 20 is configured to: obtain a location of a cursor after receiving the input end indication information of the character or the word; identify the input character or word forward from the location of the cursor until a first punctuation input before the character or the word is identified; use the identified character or word as a previous text, and query a word library for a next text associated with the previous text; and output the associated next text.

The display module 30 is configured to display the next text input by the input apparatus for a user to select to input.

The terminal provided in the embodiment of the present invention is capable of associating a next text according to an input previous text for the user to select after the user presses an input end key to end the input of a character or a word, so that the input efficiency is increased.

The terminal provided in the embodiment of the present invention is not limited to such devices as a handset, a portable computer, and a desktop computer. The input method provided in the embodiments of the present invention is not limited to the Chinese input method or the English input method.

Persons of ordinary skill in the art may understand that all or part of the steps of the methods in the foregoing embodiments may be implemented by a computer program instructing relevant hardware. The program may be stored in a computer readable storage medium. The storage medium may include a ROM, a RAM, a magnetic disk, or an optical disk, and so on.

An input method, an input apparatus, and a terminal that are provided in the embodiments of the present invention are introduced in detail in the foregoing. Specific examples are used for illustrating principles and implementation manners of the present invention. The foregoing descriptions of the embodiments are merely used to help understand the methods and core ideas of the present invention. Meanwhile, persons of ordinary skill in the art may make modifications to the specific implementation manners and application scopes according to the idea of the present invention. In conclusion, the content of the specification shall not be construed as a limitation to the present invention.

What is claimed is:

1. An input method for completing a missing text or a phrase on a display of a device terminal, comprising:
    receiving an input of a plurality of words as a first phrase or a first sentence through key entries for displaying on the device terminal;
    receiving an input of a first punctuation, wherein the first punctuation follows after the first phrase or the first sentence;
    receiving an input of a plurality of words as a second phrase or a second sentence through key entries for displaying on the device terminal, wherein the second phrase or the second sentence follows after the first punctuation;
    detecting a first location of a cursor on the display of the device terminal, wherein the first location of the cursor is positioned after an end of the second phrase or the second sentence;
    identifying by the device terminal, one or more words within only the second phrase or the second sentence which is located between the first punctuation and the first location of the cursor;
    using the identified one or more words within only the second phrase or the second sentence as a first previous text or a first previous phrase, querying for a first next text or a first next phrase from a word library in a memory of the device terminal, wherein the first next text or the first next phrase is associated in context with the first previous text or the first previous phrase;
    outputting on the display of the device terminal, the associated first next text or first next phrase which appends after the end of the second phrase or the second sentence;
    detecting a second location of the cursor on the display of the device terminal after the associated first next text or first next phrase is outputted, wherein the second location of the cursor is positioned before the first location of the cursor, and wherein the second location of the cursor is positioned after the first punctuation;
    identifying by the device terminal, one or more words within only a third phrase or a third sentence which is located between the first punctuation and the second location of the cursor;
    using the identified one or more words within only the third phrase or the third sentence as a second previous text or a second previous phrase, querying for a second next text or a second next phrase from the word library in the memory of the device terminal, wherein the second next text or the second next phrase is associated in context with the second previous text or the second previous phrase; and
    outputting on the display of the device terminal, the associated second next text or second next phrase which appends after the end of the third phrase or the third sentence.

2. The input method according to claim 1, wherein the querying for the first next text or the first next phrase from the word library in the memory of the device terminal, comprises:
    querying from the word library for all expressions and sentences comprising the first previous text or the first previous phrase, and using an expression or a sentence that exists in the found expressions and sentences but does not exist in the first previous text or the first previous phrase as the first next text or the first next phrase.

3. The input method according to claim 1, wherein the querying for the first next text or the first next phrase from the word library in the memory of the device terminal, comprises:
    grouping by the device terminal, the first previous text or the first previous phrase according to an input sequence and frequently used words, and using a last input group of a character or a word as an index; and
    querying the word library from the memory for expressions and sentences comprising the index, and using an expression or a sentence that exists in the found expressions and sentences but does not exist in the index as the first next text or the first next phrase.

4. The input method according to claim 1, wherein the querying for the second next text or the second next phrase from the word library in the memory of the device terminal, comprises:
    querying from the word library for all expressions and sentences comprising the second previous text or the second previous phrase, and using an expression or a sentence that exists in the found expressions and sentences but does not exist in the second previous text or the second previous phrase as the second next text or the second next phrase.

5. The input method according to claim 1, wherein the querying for the second next text or the second next phrase from the word library in the memory of the device terminal, comprises:
    grouping by the device terminal, the second previous text or the second previous phrase according to an input sequence and frequently used words, and using a last input group of a character or a word as an index; and querying the word library from the memory for expressions and sentences comprising the index, and using an expression or a sentence that exists in the found expressions and sentences but does not exist in the index as the second next text or the second next phrase.

6. An input apparatus, comprising a processor which executes program codes stored in a non-transitory computer readable storage medium to perform functions, which configures the apparatus to:

receive an input of a plurality of words as a first phrase or a first sentence through key entries for displaying on the apparatus;

receive an input of a first punctuation, wherein the first punctuation follows after the first phrase or the first sentence;

receive an input of a plurality of words as a second phrase or a second sentence through key entries for displaying on the apparatus, wherein the second phrase or the second sentence follows after the first punctuation;

detect a first location of a cursor on a display of the apparatus, wherein the first location of the cursor is positioned after an end of the second phrase or the second sentence;

identify one or more words within only the second phrase or the second sentence which is located between the first punctuation and the first location of the cursor;

use the identified one or more words within only the second phrase or the second sentence as a first previous text or a first previous phrase, and query for a first next text or a first next phrase from a word library in a memory of the apparatus, wherein the first next text or the first next phrase is associated in context with the first previous text or the first previous phrase;

output on the display of the apparatus, the associated first next text or first next phrase which appends after the end of the second phrase or the second sentence;

detect a second location of the cursor on the display of the apparatus after the associated first next text or first next phrase is outputted, wherein the second location of the cursor is positioned before the first location of the cursor, wherein the second location of the cursor is positioned after the first punctuation;

identify one or more words within only a third phrase or a third sentence which is located between the first punctuation and the second location of the cursor;

use the identified one or more words within only the third phrase or the third sentence as a second previous text or a second previous phrase, and query for a second next text or a second next phrase from the word library in the memory of the apparatus, wherein the second next text or the second next phrase is associated in context with the second previous text or the second previous phrase; and output on the display of the apparatus, the associated second next text or second next phrase which appends after the end of the third phrase or the third sentence.

7. The input apparatus according to claim 6, wherein in querying for the first next text or the first next phrase from the word library in the memory of the apparatus, the apparatus is configured to:

query from the word library for all expressions and sentences comprising the first previous text or the first previous phrase, and use an expression or a sentence that exists in the found expressions and sentences but does not exist in the first previous text or the first previous phrase as the first next text or the first next phrase.

8. The input apparatus according to claim 6, wherein in querying for the first next text or the first next phrase from the word library in the memory of the apparatus, the apparatus is configured to:

group the first previous text or the first previous phrase according to an input sequence and frequently used words, and use a last input group of a character or a word as an index;

query the word library for expressions and sentences comprising the index, and use an expression or a sentence that exists in the found expressions and sentences but does not exist in the index as the first next text or the first next phrase.

9. The input apparatus according to claim 6, wherein in querying for the second next text or the second next phrase from the word library in the memory of the apparatus, the apparatus is configured to:

query from the word library for all expressions and sentences comprising the second previous text or the second previous phrase, and use an expression or a sentence that exists in the found expressions and sentences but does not exist in the second previous text or the second previous phrase as the second next text or the second next phrase.

10. The input apparatus according to claim 6, wherein in querying for the second next text or the second next phrase from the word library in the memory of the apparatus, the apparatus is configured to:

group the second previous text or the second previous phrase according to an input sequence and frequently used words, and use a last input group of a character or a word as an index; and query the word library from the memory for expressions and sentences comprising the index, and use an expression or a sentence that exists in the found expressions and sentences but does not exist in the index as the second next text or the second next phrase.

11. A terminal, comprising an input apparatus and a display, wherein the input apparatus causes a processor to execute program codes stored in a non-transitory computer readable storage medium to perform functions, which configures the input apparatus to:

receive an input of a plurality of words as a first phrase or a first sentence through key entries for displaying on the terminal;

receive an input of a first punctuation, wherein the first punctuation follows after the first phrase or the first sentence;

receive an input of a plurality of words as a second phrase or a second sentence through key entries for displaying on the terminal, wherein the second phrase or the second sentence follows after the first punctuation;

detect a first location of a cursor on the display of the terminal, wherein the first location of the cursor is positioned after an end of the second phrase or the second sentence;

identify one or more words within only the second phrase or the second sentence which is located between the first punctuation and the first location of the cursor;

use the identified one or more words within only the second phrase or the second sentence as a first previous text or a first previous phrase, query for a first next text or a first next phrase from a word library in a memory of the terminal, wherein the first next text or the first next phrase is associated in context with the first previous text or the first previous phrase;

output on the display of the terminal, the associated first next text or first next phrase which appends after the end of the second phrase or the second sentence;

detect a second location of the cursor on the display of the terminal after the associated first next text or first next phrase is outputted, wherein the second location of the cursor is positioned before the first location of the cursor, wherein the second location of the cursor is positioned after the first punctuation;

identify one or more words within only a third phrase or a third sentence which is located between the first punctuation and the second location of the cursor;

use the identified one or more words within only the third phrase or the third sentence as a second previous text or a second previous phrase, and query for a second next text or a second next phrase from the word library in the memory of the terminal, wherein the second next text or the second next phrase is associated in context with the second previous text or the second previous phrase; and output on the display of the terminal, the associated second next text or second next phrase which appends after the end of the third phrase or the third sentence.

12. The terminal according to claim 11, wherein in querying for the first next text or the first next phrase from the word library in the memory of the terminal, the input apparatus is configured to:

query from the word library for all expressions and sentences comprising the first previous text or the first previous phrase, and use an expression or a sentence that exists in the found expressions and sentences but does not exist in the first previous text or the first previous phrase as the first next text or the first next phrase.

13. The terminal according to claim 11, wherein in the querying for the first next text or the first next phrase from the word library in the memory of the terminal, the input apparatus is configured to:

group the first previous text or the first previous phrase according to an input sequence and frequently used words, and use a last input group of a character or a word as an index;

query the word library for expressions and sentences comprising the index, and use an expression or a sentence that exists in the found expressions and sentences but does not exist in the index as the first next text or the first next phrase.

14. The terminal according to claim 11, wherein in querying for the second next text or the second next phrase from the word library in the memory of the terminal, the input apparatus is configured to:

query from the word library for all expressions and sentences comprising the second previous text or the second previous phrase, and use an expression or a sentence that exists in the found expressions and sentences but does not exist in the second previous text or the second previous phrase as the second next text or the second next phrase.

15. The terminal according to claim 11, wherein in querying for the second next text or the second next phrase from the word library in the memory of the terminal, the input apparatus is configured to:

group the second previous text or the second previous phrase according to an input sequence and frequently used words, and use a last input group of a character or a word as an index; and query the word library from the memory for expressions and sentences comprising the index, and use an expression or a sentence that exists in the found expressions and sentences but does not exist in the index as the second next text or the second next phrase.

16. An input method for completing a missing text or a phrase on a display of a terminal, comprising:

displaying, by the terminal, a first text inputted by a user;

displaying, by the terminal, a comma after the first text, the comma being directly to the right of the first text;

displaying, by the terminal, a second text inputted by the user, the second text being directly to the right of the comma;

displaying, by the terminal, a cursor at a first location, the first location being directly to the right of the second text;

querying, by the terminal, for a first prediction text from a word library in a memory of the terminal by using one or more words within the second text as a context;

displaying, by the terminal, the first prediction text directly to the right of the second text;

displaying, by the terminal, the cursor at a second location, the second location of the cursor being to the left of the end of the first prediction text and to the right of the comma;

querying, by the terminal, for a second prediction text from the word library in the memory of the terminal by using one or more words within text between the comma and the second location of the cursor as a context, displaying, by the terminal, the second prediction text.

17. The input method according to claim 16, wherein the first text is a phrase or a sentence.

18. The input method according to claim 16, wherein the second text is a phrase or a sentence.

* * * * *